US012662093B2

(12) United States Patent
Martin, Jr.

(10) Patent No.: US 12,662,093 B2
(45) Date of Patent: Jun. 23, 2026

(54) INTEGRATED ACTUATOR PLATE FOR EBRAKE

(71) Applicant: Goodrich Corporation, Charlotte, NC (US)

(72) Inventor: James Michael Martin, Jr., Dayton, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 475 days.

(21) Appl. No.: 18/108,505

(22) Filed: Feb. 10, 2023

(65) Prior Publication Data

US 2024/0270216 A1      Aug. 15, 2024

(51) Int. Cl.
| | |
|---|---|
| *F16D 55/38* | (2006.01) |
| *B60T 8/17* | (2006.01) |
| *B60T 13/74* | (2006.01) |
| *F16D 55/02* | (2006.01) |
| *F16D 55/225* | (2006.01) |
| *F16D 55/40* | (2006.01) |
| *F16D 66/00* | (2006.01) |
| *F16D 121/02* | (2012.01) |
| *F16D 121/24* | (2012.01) |
| *F16D 125/02* | (2012.01) |
| *F16D 125/40* | (2012.01) |

(52) U.S. Cl.
CPC .......... *B60T 8/1703* (2013.01); *B60T 13/745* (2013.01); *F16D 55/025* (2013.01); *F16D 55/225* (2013.01); *F16D 55/38* (2013.01); *F16D 55/40* (2013.01); *F16D 2066/001* (2013.01); *F16D 2121/02* (2013.01); *F16D 2121/24* (2013.01); *F16D 2125/02* (2013.01); *F16D 2125/40* (2013.01); *F16D 2500/1023* (2013.01); *F16D 2500/1026* (2013.01)

(58) Field of Classification Search
CPC ...... F16D 55/025; F16D 55/225; F16D 55/38; F16D 55/40; B64C 25/42; B64C 25/44
See application file for complete search history.

(56) References Cited

U.S. PATENT DOCUMENTS

| | | | | |
|---|---|---|---|---|
| 3,357,521 | A | * | 12/1967 | Lallemant ............... F16D 55/40 188/72.4 |
| 3,887,046 | A | * | 6/1975 | Bueler .................... G01P 3/488 310/168 |
| 3,998,298 | A | * | 12/1976 | Fleagle ................... G01P 3/488 310/168 |
| 9,428,162 | B1 | | 8/2016 | Poisson et al. |

(Continued)

FOREIGN PATENT DOCUMENTS

JP        2013024394        2/2013

OTHER PUBLICATIONS

European Patent Office, European Search Report dated Jul. 3, 2024 in Application No. 24157038.1.

*Primary Examiner* — Nicholas J Lane
(74) *Attorney, Agent, or Firm* — SNELL & WILMER L.L.P.

(57) ABSTRACT

A brake actuator plate assembly includes an electromechanical brake actuator, a connector configured to communicatively couple with an aircraft, a wire harness configured to terminate at the connector and conduct at least one of a voltage or a current to and from an actuator motor, and an actuator plate comprising a wire harness channel configured to house the wire harness.

17 Claims, 6 Drawing Sheets

(56)                    References Cited

U.S. PATENT DOCUMENTS

|  |  |  |  |
|---|---|---|---|
| 9,995,353 | B2 | 6/2018 | Rook |
| 11,312,483 | B2 * | 4/2022 | Leong .................... F16L 39/04 |
| 2006/0042889 | A1 * | 3/2006 | Linden ................... F16D 65/18 |
|  |  |  | 188/71.5 |
| 2006/0152074 | A1 | 7/2006 | Chico et al. |
| 2007/0187192 | A1 * | 8/2007 | Anderson .............. F16D 65/18 |
|  |  |  | 188/158 |
| 2009/0120739 | A1 * | 5/2009 | Corio ................. F16D 65/0043 |
|  |  |  | 188/73.32 |
| 2013/0341134 | A1 * | 12/2013 | Chico ................... F16D 65/28 |
|  |  |  | 188/158 |
| 2015/0267812 | A1 * | 9/2015 | Hinton ................... F16D 55/00 |
|  |  |  | 92/172 |
| 2017/0152027 | A1 * | 6/2017 | Onfroy ................ B60T 13/741 |
| 2017/0175831 | A1 * | 6/2017 | Rook ................... B60T 8/1703 |

* cited by examiner

INTEGRATED ACTUATOR PLATE FOR EBRAKE

FIELD

The present disclosure relates to aircraft braking systems, and more specifically, to the packaging of electrical wires and interface with actuators.

BACKGROUND

Typically, an aircraft may comprise a plurality of electromechanical brake assemblies that are configured to apply force to a brake stack on an aircraft wheel. Currently, an electrical harness is included in electromechanical brake assemblies, but these may be exposed to harsh environments. For instance, standard connectors may be moisture ingress failure points, the electrical harness may be exposed to environmental hazards such as being contacted by operators and/or with other machinery, which can damage the electrical harness. Such failures can impact brake reliability.

SUMMARY

Systems are provided herein for a brake actuator plate assembly. The brake actuator plate assembly includes an electromechanical brake actuator, a connector configured to communicatively couple with an aircraft, a wire harness configured to terminate at the connector and conduct at least one of a voltage or a current to and from an actuator motor, and an actuator plate comprising a wire harness channel configured to house the wire harness.

In various embodiments, the wire harness is disposed in the actuator plate.

In various embodiments, the brake actuator plate assembly further includes contacts configured to interface with and detect signals from a secondary component.

In various embodiments, the wire harness channel is a recessed channel within the actuator plate. The brake actuator plate assembly further comprises a cover plate.

In various embodiments, the brake actuator plate assembly further includes a sensor contact for a brake temperature sensor. The sensor contact is configured to interface with and transmit signals regarding heat from a temperature sensor during a braking event.

In various embodiments, the wire harness channel is an internal cavity within the actuator plate.

In various embodiments, the wire harness channel is configured circumferentially around the actuator plate.

In various embodiments, the brake actuator plate assembly further includes a second wire harness channel.

In various embodiments, the brake actuator plate assembly further includes at least one channel arm.

In various embodiments, the at least one channel arm is configured to extend from the wire harness channel to the connector.

In various embodiments, the wire harness channel is formed via at least one of machining, forging, or additive manufacturing.

A brake actuator plate assembly is disclosed herein. The brake actuator plate assembly includes an actuator plate having a wire harness channel formed therein and an electromechanical brake actuator coupled to the actuator plate. The brake actuator plate assembly includes a connector disposed on the actuator plate and a wire harness disposed within the wire harness channel. The connector is configured to communicatively couple with an aircraft, and the wire harness electrically couples the connector and the electromechanical brake actuator.

An aircraft brake arrangement is disclosed herein. The aircraft brake arrangement includes an actuator plate assembly, an actuator motor coupled to the electromechanical brake actuator and configured to cause the electromechanical brake actuator to actuate, a ball screw and a motor shaft coupled to the electromechanical brake actuators, an end plate, a pressure plate, and a plurality of rotating discs and stators positioned in an alternating fashion between the end plate and the pressure plate. The actuator plate assembly includes an electromechanical brake actuator and an actuator plate having a wire harness disposed in the actuator plate. In response to a brake command, the electromechanical brake actuator causes the motor shaft to rotate, thus moving the ball screw toward the pressure plate, the pressure plate applying force towards the end plate.

In various embodiments, the electromechanical brake actuator is an electrohydraulic actuator.

In various embodiments, the electromechanical brake actuator is actuated in response to current being applied to the actuator motor.

In various embodiments, the actuator plate assembly further includes a connector configured to communicatively couple with an aircraft. The wire harness is configured to terminate at the connector and conduct at least one of a voltage or a current to and from the actuator motor.

In various embodiments, the actuator plate includes a wire harness channel configured to house the wire harness.

In various embodiments, the wire harness is disposed in the actuator plate such that the wire harness channel is an internal cavity within the actuator plate.

In various embodiments, the actuator plate assembly further includes at least one channel arm configured to extend from the wire harness channel to the connector.

In various embodiments, the actuator plate assembly further includes contacts configured to interface with and detect signals from a secondary component.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step.

As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling").

While described in the context of aircraft applications, and more specifically, in the context of brake control, the various embodiments of the present disclosure may be applied to any suitable application.

Figure 1A:
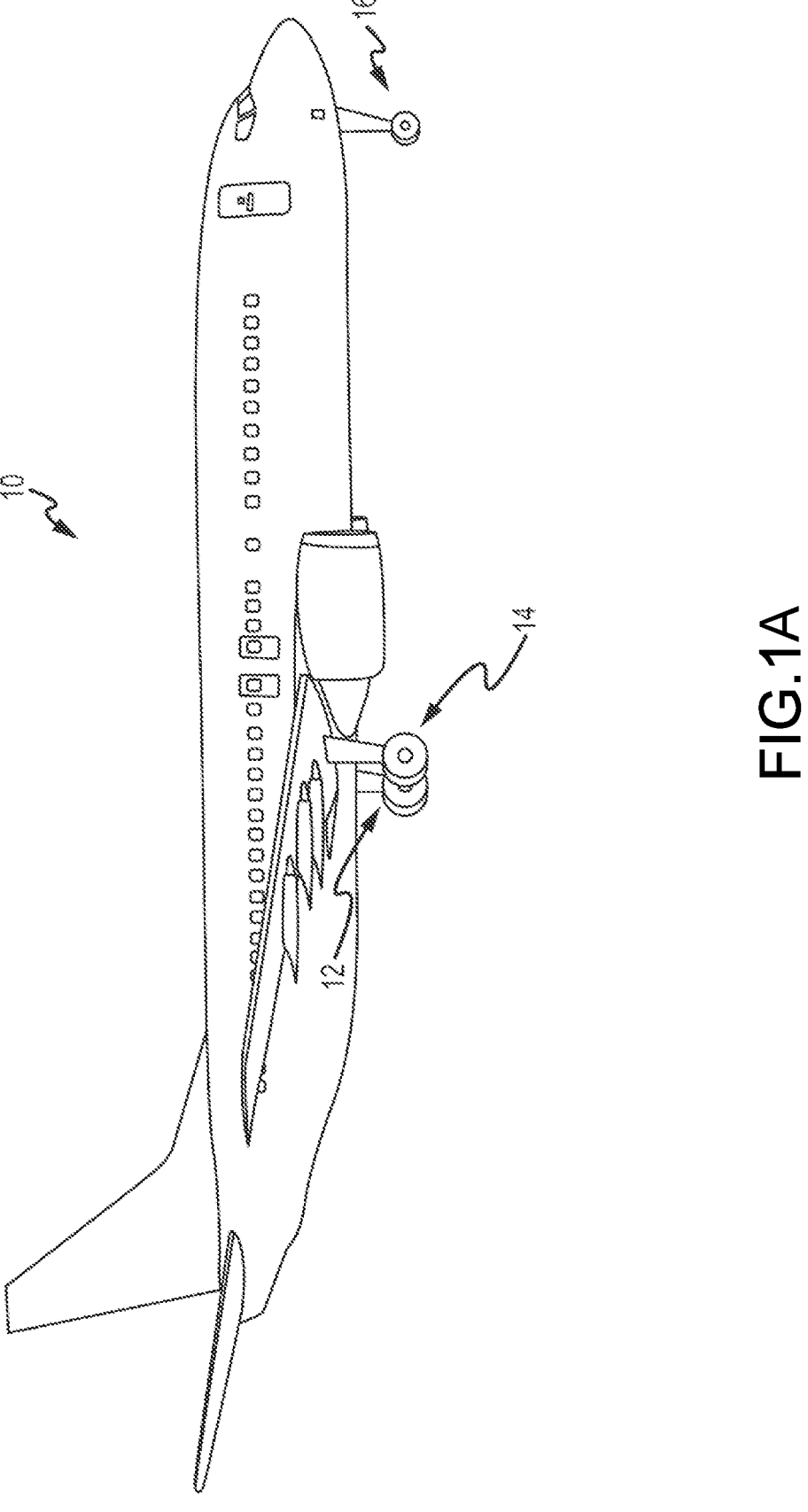
FIG. 1A illustrates an exemplary aircraft having a brake system, in accordance with various embodiments.

Referring to FIG. 1A, in accordance with various embodiments, an aircraft 10 is illustrated. The aircraft 10 includes landing gear, which may include a left main landing gear 12, a right main landing gear 14 and a nose landing gear 16. The landing gear support the aircraft 10 when it is not flying, allowing the aircraft 10 to taxi, take off and land without damage. While the disclosure refers to the three landing gear configurations just referred, the disclosure nevertheless contemplates any number of landing gear configurations.

Figure 1B:
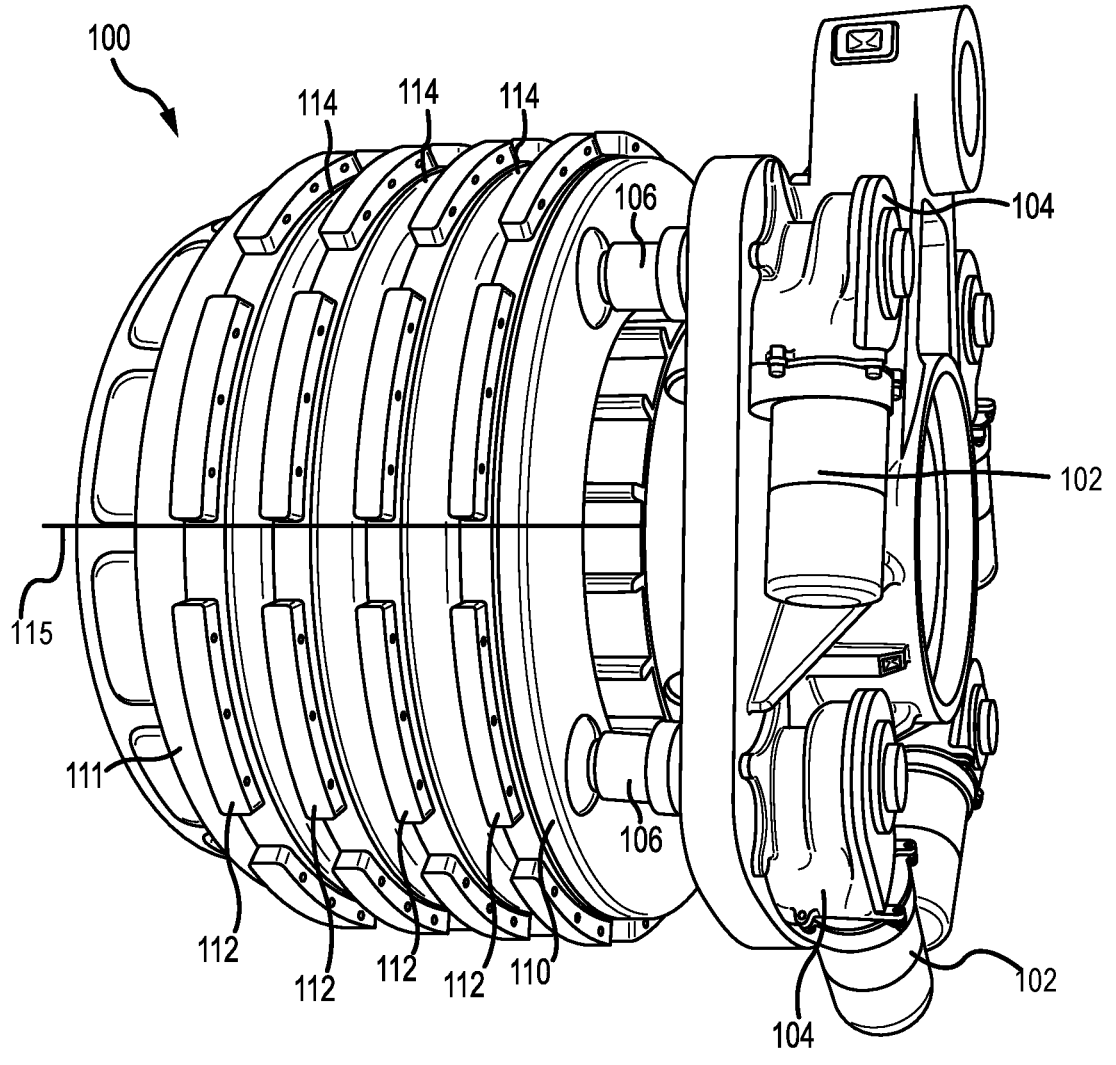
FIG. 1B illustrates an aircraft brake in accordance with various embodiments.
Figure 1B:
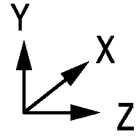

Referring to FIG. 1B, an aircraft brake arrangement 100 in accordance with various embodiments is illustrated. Aircraft brake arrangement 100 may include a plurality of actuator motors 102, a plurality of electromechanical brake actuators 104, a plurality of ball screws 106, an end plate 111 and a pressure plate 110, and a plurality of rotating discs 112 and stators 114 positioned in an alternating fashion between end plate 111 and pressure plate 110. Rotating discs 112 may rotate about an axis 115 and the stators 114 may have no angular movement relative to axis 115. Wheels may be coupled to rotating discs 112 such that a linear speed of the aircraft is proportional to the angular speed of rotating discs 112. As force is applied to pressure plate 110 towards end plate 111 along the axis 115, rotating discs 112 and stators 114 are forced together in an axial direction. This causes the rotational speed of rotating discs 112 to become reduced (i.e., causes braking effect) due to friction between rotating discs 112, stators 114, end plate 111 and pressure plate 110. In response to sufficient force being exerted on rotating discs 112 via pressure plate 110, the rotating discs 112 will stop rotating.

In order to exert this force onto pressure plate 110, actuator motor 102 may cause electromechanical brake actuator 104 to actuate. Although referred to herein as electromechanical brake actuator 104, it is contemplated that, in various embodiments, electromechanical brake actuator 104 may be an electrohydraulic actuator. In various embodiments, actuator motor 102 may be a brushless motor, such as a permanent magnet synchronous motor (PMSM), a permanent-magnet motor (PMM) or the like. In various embodiments, electromechanical brake actuator 104 may be coupled to or otherwise operate a motor shaft and a pressure generating device, such as, for example, a ball screw, a ram, and/or the like. In response to actuation or a brake command, electromechanical brake actuator 104 causes the motor shaft to rotate. Rotation of the motor shaft 204 may cause rotation of a ball screw 206 (e.g., see FIG. 2), and rotational motion of the ball screw 206 may be transformed into linear motion of a ball nut 106. Linear translation of ball nut 106 towards pressure plate 110 applies force on pressure plate 110 towards end plate 111.

Figure 2:
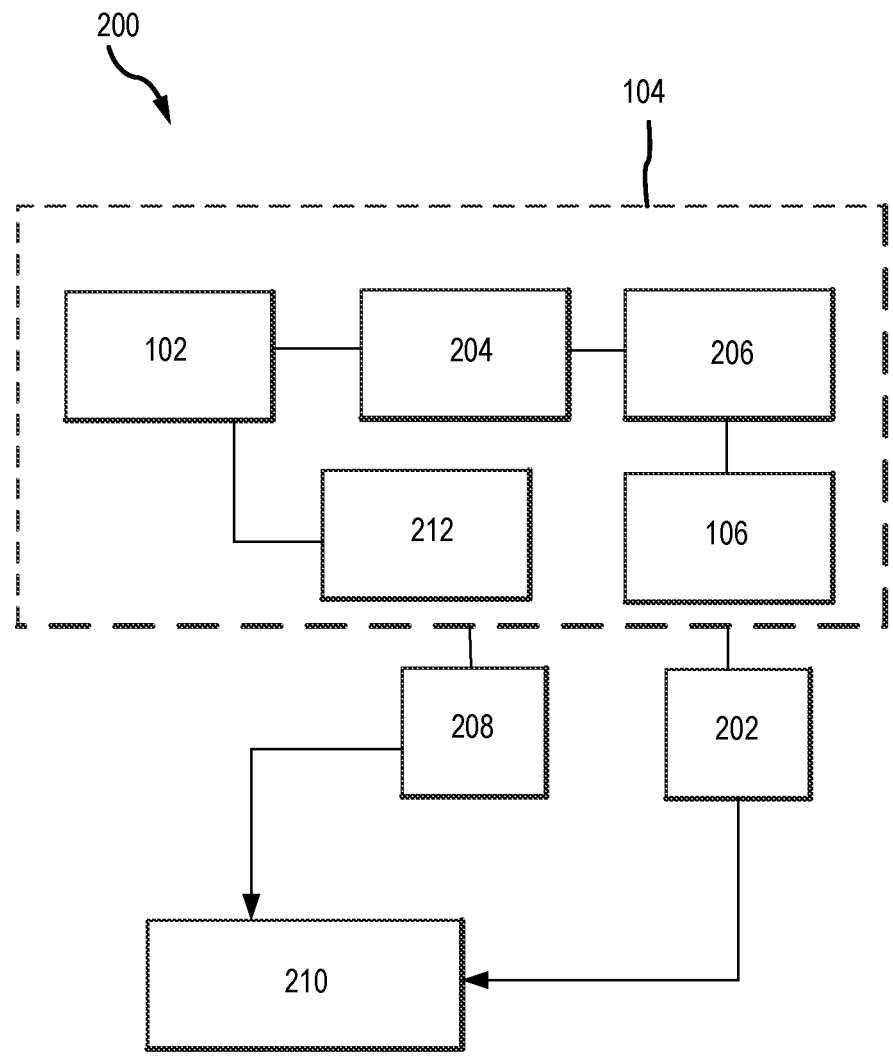
FIG. 2 illustrates a block diagram of an electromechanical brake actuator control system in accordance with various embodiments.

Electromechanical brake actuator 104 is actuated in response to current being applied to actuator motor 102. The amount of force applied by electromechanical brake actuator 104 is related to the amount of current applied to actuator motor 102. With reference to FIG. 2, in various embodiments, an electromechanical brake actuator control system 200 may comprise a current sensor 212 to detect an amount of current provided to actuator motor 102. Current sensor 212 may be in communication with actuator motor 102 and/or with various other components of an electromechanical brake actuator 104, an electromechanical brake actuator control system 200, and/or an aircraft 10. In various embodiments, current sensor 212 may be disposed on or adjacent to actuator motor 102. However, current sensor 212 may be disposed in any location suitable for detection of electrical current supplied to the actuator motor 102.

Application of current to actuator motor 102 causes rotation of motor shaft 204. In various embodiments, electromechanical brake actuator control system 200 may comprise a position sensor 208. Position sensor 208 may be configured so as to measure the rotational speed and position of motor shaft 204. In various embodiments, position sensor 208 may be disposed in or adjacent to electromechanical brake actuator 104, or on or adjacent to actuator motor 102. However, position sensor 208 may be disposed in any location suitable for detection of the rotational speed and position of motor shaft 204. In various embodiments, position sensor 208 may comprise a resolver, tachometer, or the like.

In various embodiments, electromechanical brake actuator control system 200 may comprise a load cell 202. Load cell 202 may be configured so as to measure the amount of force being applied between ball nut 106 and pressure plate 110. In various embodiments, load cell 202 may be disposed in or adjacent to electromechanical brake actuator 104, or on or adjacent to ball nut 106. However, load cell 202 may be disposed in any location suitable for detection of the force being applied between ball nut 106 and pressure plate 110. A controller may receive the detected force and rotational speed, and calculate an adjusted force and an adjusted rotational speed based on those detected values. In various embodiments, electromechanical brake actuator control system 200 may comprise a fault tolerant module 210.

In various embodiments, a system for brake actuator operation with load cell fault tolerant technology comprises four load cells 202 and four position sensors 208 and at least one controller. The system for multiple brake actuator operation via one load cell may comprise a fault tolerant module 210. In various embodiments, fault tolerant module 210 may be a controller and/or processor. In various embodiments, fault tolerant module 210 may be implemented in a single controller and/or processor. In various embodiments, fault tolerant module 210 may be implemented in multiple controllers and/or processors. In various embodiments, fault tolerant module 210 may be implemented in an electromechanical actuator controller and/or a brake control unit.

Figure 3A:
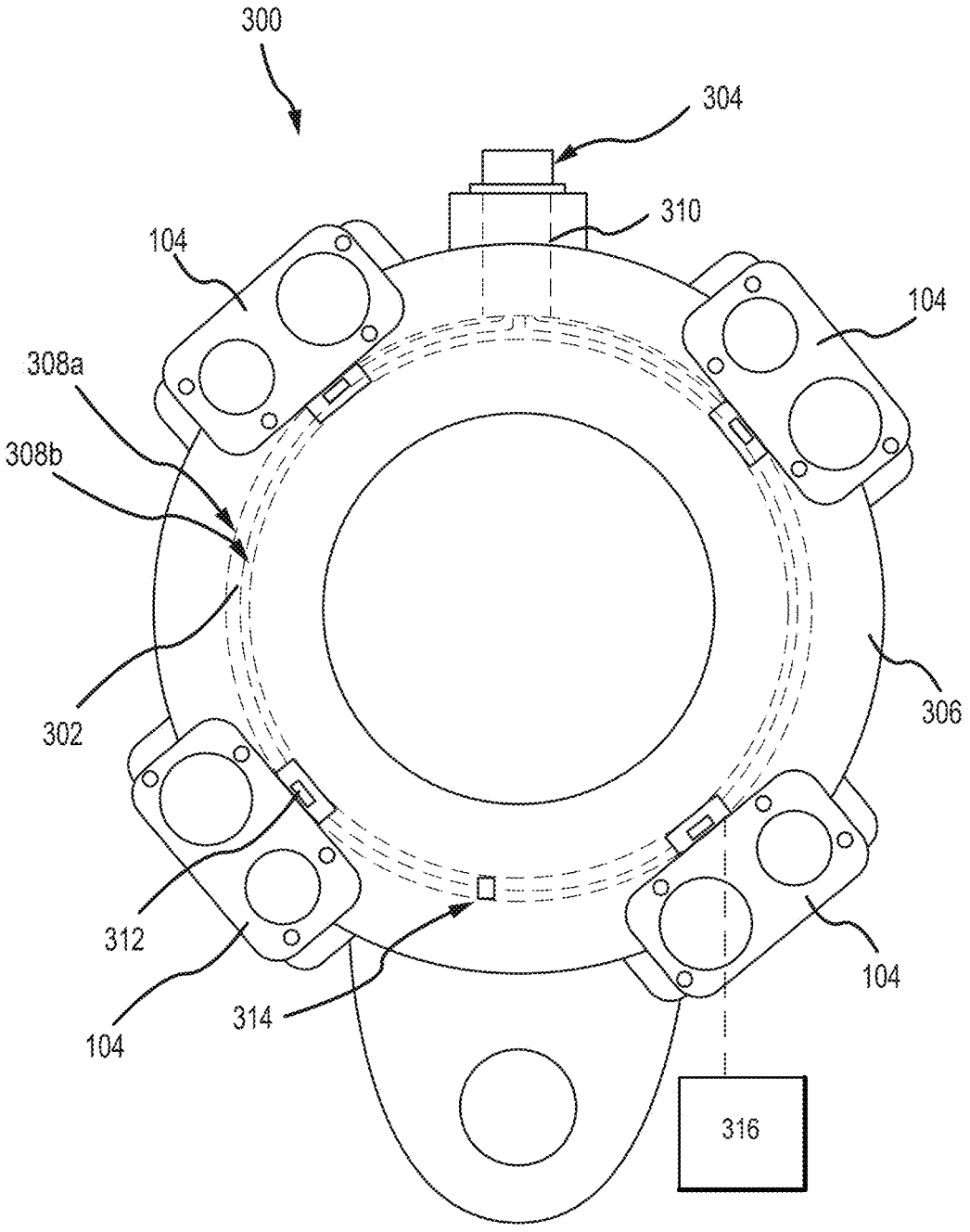
FIGS. 3A, 3B, and 3C illustrate a brake actuator plate, in accordance with various embodiments.
Figure 3B:
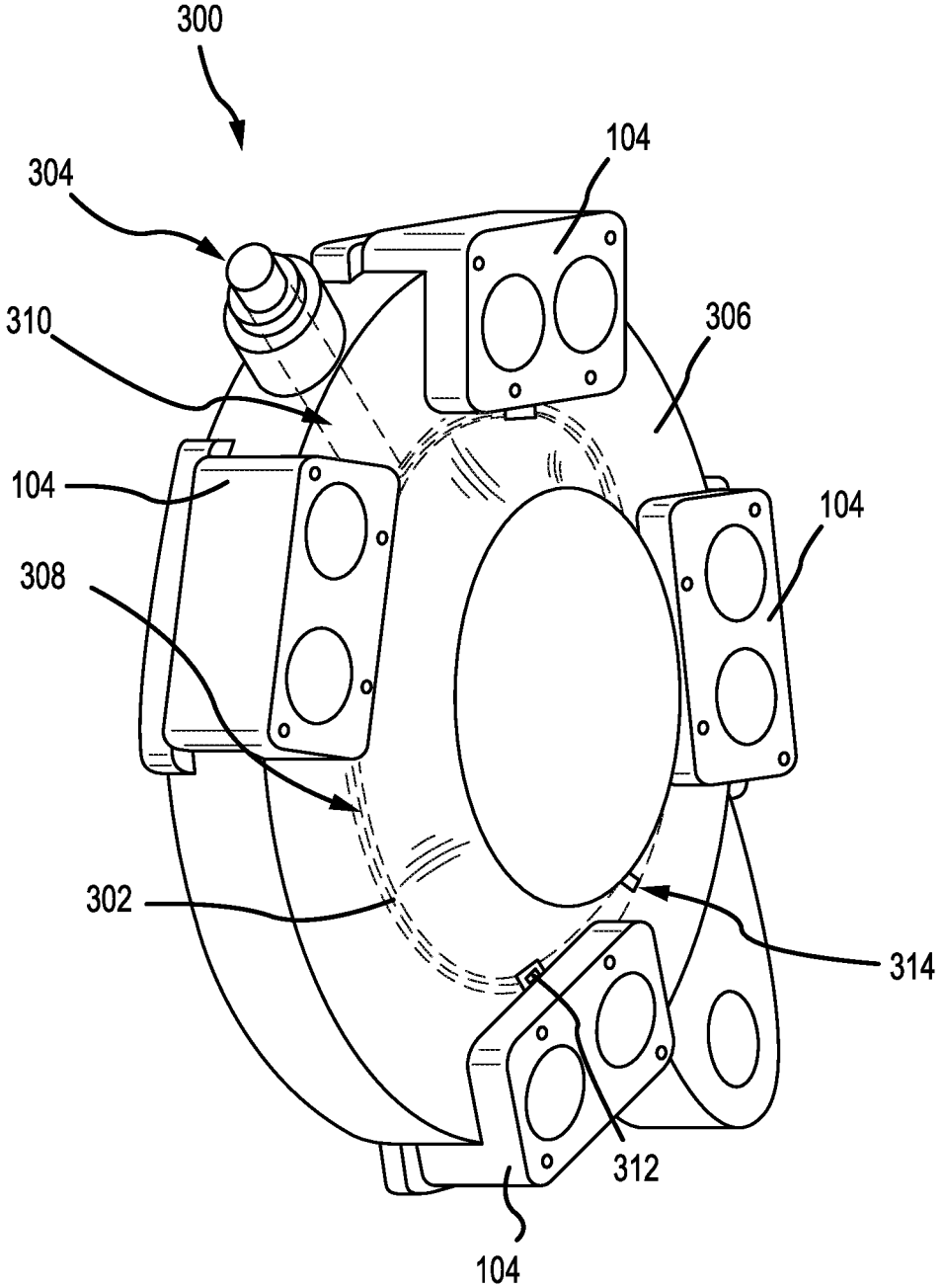

With reference to FIGS. 3A and 3B, a brake actuator plate assembly 300 is illustrated. The brake actuator plate assembly 300 is configured to reduce reliance on external wiring harnesses for electromechanical brakes. The brake actuator plate assembly 300 comprises the electromechanical brake actuator 104, a wire harness 302, a connector 304, and an actuator plate 306. The electromechanical brake actuator 104, or EBA, may be a bolt-on EBA. The wire harness 302 may be an electrical harness that conducts power (e.g., high voltages and/or currents) and signals (low voltages and/or currents) to and from the EBAs 104 of the aircraft brake arrangement 100, the EBAs 104 are configured to send power to drive the actuator motor 102 and receive feedback signals (e.g., how much clamp force is being applied, whether the parking brake is set, etc.). For instance, the wire harness may include a plurality of wires with a variety of thicknesses and insulation configured to transmit the desired data or power, etc. In various embodiments, the wire harness 302 may comprise a plurality of wires for each function. The wire harness 302 within the brake actuator plate assembly 300 may terminate at the connector 304. The connector 304 is configured to communicatively couple with the aircraft brake arrangement 100.

The actuator plate 304 may comprise a wire harness channel 308. The wire harness channel 308 may be configured to house the wire harness 302 within the actuator plate 304. Wire harness 302 as disclosed herein is integrated into the actuator plate 304. In other words, the wire harness channel 308 may be disposed within (e.g., embedded or contained within) or at least partially within internal cavities within the actuator plate 304.

The wire harness channel 308 may be configured to run circumferentially around the actuator plate 306. For instance, the wire harness channel 308 may be configured substantially concentric with the circumference of the actuator plate 308. In various embodiments, the wire harness channel 308 may be configured to be straight in between each EBA 104 and the connector 304 (e.g., forming a diamond or a star shaped pathway). In various embodiments, the wire harness channel 308 may be configured to run along on side of the actuator place 306. In various embodiments, the wire harness channel 308 may include two wire harness channels 308. Accordingly, the two wire harness channels 308 may run concentrically to one another. For example, as shown in FIG. 3A, a first wire harness channel 308 *a* may be concentric with a second wire harness channel 308 *b*.

The brake actuator plate assembly 300 may include at least one channel arm 310. The at least one channel arm 310 may extend from the wire harness channel 308. For instance, the wire harness channel 308 may be configured as an annulus and the channel arm 310 may extend from the wire harness channel 308 to the connector 304. The wire harness 302 may be configured to be routed through the wire harness channel 308. In various embodiments, the wire harness channel 308 is configured to form any suitable pathway between the main connector 304 and each of the EBA 104 positions and/or to a sensor (e.g., a temperature sensor). For instance, the wire harness channel 308 must be large enough to house all of the wires, and be configured to provide a path between the main connector 304 and the appropriate designation (e.g. one or more of the EBAs, or temperature sensor, etc.).

Each wire within the wire harness 302 may be disposed within the wire harness channel 308, running from the main connector 304, around the actuator plate 308, and ending at at least one of the EBAs 104 (e.g., four EBAs 104 as show). For example, the wire harness 104 may be configured to transfer commons signals (e.g., a sensor excitation voltage, power if the motor controller is located in the EBA itself, etc.). Common wires may be configured to branch off within the wire harness 302 to each of the EBAs 104 via normal wiring harness construction methods.

In various embodiments, the wire harness channel 308 may be machined, forged, or formed via additive manufacturing into the actuator plate 306. In such configurations wherein the wire harness channel 308 is created/embedded within the actuator plate 306, the wire harness 104 is then fed, or threaded through the wire harness channel 308. For instance, the wire harness 302 may be a separate line replaceable unit (LRU). As such, the correct wires per a predetermined function (e.g., a wiring diagram or schematic provided to a supplier) for the wire harness 302 are selected and pulled through actuator plate harness openings to position the wire harness 302 within the actuator plate 306, or the wire harness 302 is laid in the wire harness channel 308. For instance, methods of positioned the wire harness 302 withing the brake actuator plate assembly 300 may include 1) positioning each wire of the wire harness 302 one at a time within the brake actuator plate assembly 300, 2) creating the harness layout on a build plate and transferring to the brake actuator plate assembly 300, or 3) a combination of either method. All of the wires terminate at the appropriate locations (e.g. main connector, EBA(s), temperature sensor) and pins or pads for the type of interface the design calls for are added. The brake actuator plate assembly 300 may then be sealed. Lastly, the EBA 104 may be added to the brake actuator plate assembly 300 to fully assemble the overall the EBA 104.

In various embodiments, the actuator plate 306 may be composed of a two-part assembly, such that the wire harness channel 308 is formed into at least one part of the two-part assembly and the wire harness 302 may be disposed in between the two-parts of the actuator plate 306. For instance, the wire harness channel 308 may be formed within a base portion of the actuator plate 306, the wire harness 302 is then positioned within the wire harness channel 308 of the base portion, and a top portion of the actuator plate 305 is placed on top. In such a configuration, one or more gaskets may be included to seal the actuator plate 308. In various embodiments, the top portion of the actuator plate 305 may include a flat surface such that the wire harness channel 308 of the base portion is sized and shaped to receive the entirety of the wire harness 302. In various embodiments, the top portion of the actuator plate 305 may include a wire harness channel 308 such that the wire harness channel 308 of the base portion and the wire harness channel 308 of the top portion together house the entirety of the wire harness 302.

Figure 3C:
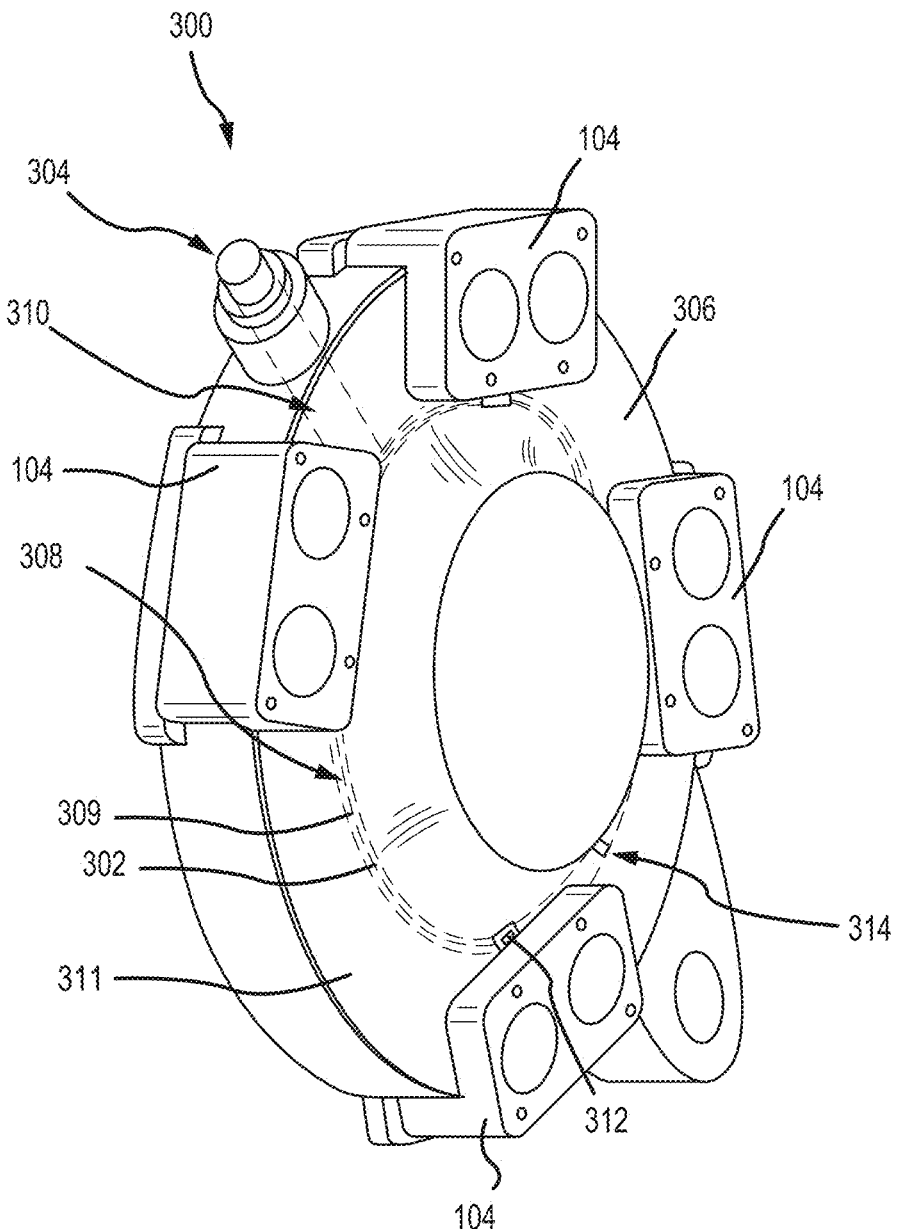

In various embodiments and with brief reference to FIG. 3C, the wire harness channel 308 is not necessarily embedded in the actuator plate 306, but instead, the wire harness channel 308 is configured as a shallow groove, or recessed channel 309, on a surface of the actuator plate 306. Accordingly, the brake actuator plate assembly may include a cover plate 311 to cover and protect the wire harness 302 when positioned in the wire harness channel 308, essentially sealing the wire harness 104 within the actuator plate assembly 300.

The brake actuator plate assembly 300 comprises contacts 312 (e.g., pins, pads, sockets, etc.). The contacts 312 may be an electrical interface or connection point configured to connect the electric actuator to the aircraft's electrical system, thus allowing the electric actuator to send and receive power and/or signals to and from the aircraft. The contacts 312 may be configured to interface with and detect signals from a secondary component 316 (e.g., a temperature sensor, a charging pad, etc.). Accordingly, the brake actuator plate assembly 300 creates a nearly connectorless electromechanical brake actuator interface for power and control. The secondary component 316 may be any component (e.g., a mating pad) suitable to couple with the contacts 312 via electronic communication, inductive electrical communication. For instance, the secondary component 316 may be configured to transfer power without physically interfacing/contact with the contacts 312. As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling").

Further, the secondary component 316 may be integrated with the actuator plate 306 and a gasket to seal around the perimeter between the actuator plate 306 and the secondary component 316. Beneficially, the brake actuator plate assembly 300 may be configured to make electrical contact with the secondary component 316 by bolting the brake actuator plate assembly 300 in place, as opposed to screwing on or otherwise attaching a contact to an external harness connection.

In various embodiments, the EBA 104 may include smart electronics onboard.

The smart electronics are configured to digitally communicate to the AC status of all of its internal sensors (e.g., temperature, load cell, park brake status, etc.) over a single pair of wires. For instance, within the EBAs 104, the secondary component 316 may include load cell sensors, parking brakes, or any analog or digital signal. Thus the smart electronics of the EBA may be configured to communicate with the aircraft regarding status, performance, health monitoring, etc.

The brake actuator plate assembly 300 comprises sensor contacts 314. The sensor contacts 314 may be configured to interface with and pick up signals regarding braking events. For instance, the sensor contacts 314 may be configured to contact a brake temperature sensor such that the sensor contacts 314 may be configured to interface with and pick up signals regarding the heat during braking events. The brake temperature sensor is configured to monitor the temperature of the brake stack. The brake temperature sensor may be included in the wire harness 302 routed within the actuator plate 306.

Further, the electromechanical brake actuator control system 200 may comprise a temperature sensor 210 (e.g., see FIG. 2) to detect the temperature of actuator motor 102. Temperature sensor 210 may be in communication with actuator motor 102 and/or with various other components of an electromechanical brake actuator 104, an electromechanical brake actuator control system 200, and/or an aircraft 10. In various embodiments, temperature sensor 210 may be disposed on or adjacent to actuator motor 102. However, temperature sensor 210 may be disposed in any location suitable for detection of the temperature of actuator motor 102. The brake actuator plate assembly 300 may include various sensor contacts configured to send signals regarding various operation events.

Accordingly, a brake actuator plate assembly, as described herein, beneficially eliminates external wiring harness for an electromechanical brake. All wires in wire harness 302 may be hermetically sealed inside the integrated actuator plate. In various embodiments, the robustness of the seal may vary. For instance, the brake actuator plate assembly may be unsealed. In various embodiments, the brake actuator plate assembly may include drainage holes to mitigate moisture ingress. No external actuator connectors are needed between electromechanical brake actuators and the actuator plate, and the associated pads or pins may be protected from environment within a sealed integrated actuator plate. Thus, the brake actuator plate assembly improves reliability and lifespan of the system. Additional benefits include better support of the entire wire harness within the cavity and physical protection of wire harness from external strikes, damage, human interaction, brake dust and other contaminants, etc., thus also provided an easier brake assembly to clean. Further, the brake actuator plate assembly as described herein may reduce or eliminate the need for connector strain relief, and reduce or eliminate dynamic "shaking" of an external harness during impact (e.g., during landing events). The Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment: for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A brake actuator plate assembly comprising:
an electromechanical brake actuator;
a connector configured to communicatively couple with an aircraft;
a wire harness configured to terminate at the connector and conduct at least one of a voltage or a current to and from an actuator motor; and
an actuator plate comprising a wire harness channel configured substantially concentric with the circumference of the actuator plate to house the wire harness, wherein the wire harness channel is an internal cavity fully contained within the actuator plate.

2. The brake actuator plate assembly of claim 1, wherein the wire harness is contained within the actuator plate.

3. The brake actuator plate assembly of claim 1, wherein the wire harness channel fully surrounds a central opening of the actuator plate.

4. The brake actuator plate assembly of claim 1, further comprising a second wire harness channel concentric with the wire harness channel.

5. The brake actuator plate assembly of claim 1, further comprising at least one channel arm extending from the wire harness channel.

6. The brake actuator plate assembly of claim 5, wherein the at least one channel arm is configured to extend from the wire harness channel to the connector.

7. The brake actuator plate assembly of claim 1, wherein the wire harness channel is formed via at least one of machining, forging, or additive manufacturing.

8. The brake actuator plate assembly of claim 1, further comprising contacts configured to interface with and detect signals from a secondary component.

9. The brake actuator plate assembly of claim 1, wherein the wire harness channel is an internal channel fully contained within the actuator plate, the brake actuator plate assembly further comprising a cover plate.

10. The brake actuator plate assembly of claim 1, further comprising a sensor contact for a brake temperature sensor wherein the sensor contact is configured to interface with and transmit signals regarding heat from a temperature sensor during a braking event.

11. A brake actuator plate assembly comprising:
an actuator plate comprising a wire harness channel formed therein;
an electromechanical brake actuator coupled to the actuator plate;
a connector disposed on the actuator plate, the connector configured to communicatively couple with an aircraft; and a wire harness disposed within or at least partially within the wire harness channel and electrically coupling the connector and the electromechanical brake actuator, wherein the wire harness channel is configured substantially concentric with the circumference of the actuator plate and fully surrounds a central opening of the actuator plate.

12. An aircraft brake arrangement comprising:
an actuator plate assembly comprising a first electromechanical brake actuator, a second electromechanical brake actuator, a connector, and an actuator plate having a wire harness disposed in a wire harness channel of the actuator plate, the wire harness channel fully contained within an internal cavity within the actuator plate, wherein the wire harness is configured to terminate at the connector and is routed within or at least partially within the wire harness channel from the connector to each of the first electromechanical brake actuator and the second electromechanical brake actuator;
an actuator motor coupled to the electromechanical brake actuator and configured to cause the electromechanical brake actuator to actuate;
a ball screw and a motor shaft coupled to the electromechanical brake actuators;
an end plate;
a pressure plate; and
a plurality of rotating discs and stators positioned in an alternating fashion between the end plate and the pressure plate,
wherein, in response to a brake command, the electromechanical brake actuator causes the motor shaft to rotate, thus moving the ball screw toward the pressure plate, the pressure plate applying force towards the end plate.

13. The aircraft brake arrangement of claim 12, wherein the electromechanical brake actuator is an electrohydraulic actuator.

14. The aircraft brake arrangement of claim 12, wherein the electromechanical brake actuator is actuated in response to current being applied to the actuator motor.

15. The aircraft brake arrangement of claim 12, wherein the connector is configured to communicatively couple with an aircraft, the wire harness configured to conduct at least one of a voltage or a current to and from the actuator motor.

16. The aircraft brake arrangement of claim 12, wherein the actuator plate assembly further comprises at least one channel arm configured to extend from the wire harness channel to the connector.

17. The aircraft brake arrangement of claim 12, wherein the actuator plate assembly further comprises contacts configured to interface with and detect signals from a secondary component.

* * * * *